UNITED STATES PATENT OFFICE.

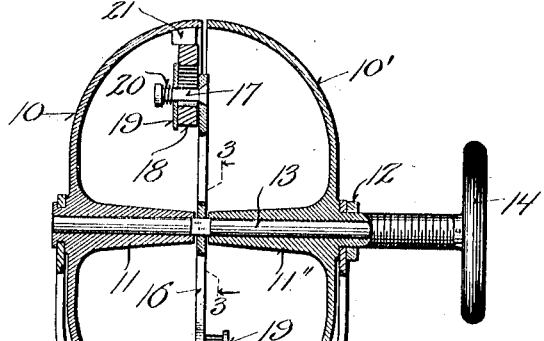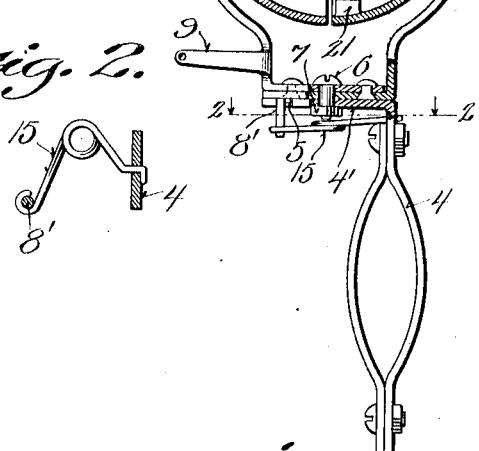

GEORGE F. CREMER AND JOSEPH J. LANTRY, OF MILWAUKEE, WISCONSIN.

BELL.

1,035,321.  Specification of Letters Patent.  Patented Aug. 13, 1912.

Application filed February 8, 1912. Serial No. 676,356.

*To all whom it may concern:*

Be it known that we, GEORGE F. CREMER and JOSEPH J. LANTRY, both citizens of the United States, and residents of Milwaukee, in the county of Milwaukee and State of Wisconsin, have invented certain new and useful Improvements in Bells; and we do hereby declare that the following is a full, clear, and exact description thereof.

Our invention consists in what is herein particularly set forth with reference to the accompanying drawings and pointed out in the claims of this specification, its object being to provide simple, economical preferably wheel-actuated bells especially designed for connection with motorcycles, automobiles and other vehicles for signaling purposes.

Figure 1 of the drawings represents a plan view of a wheel-actuated bell attachment in accordance with our invention partly in horizontal section; Fig. 2, an elevation of a detail of the same, and Fig. 3, a partly sectional view of another detail of said attachment generally indicated by line 3—3 in Fig. 1.

Referring by numerals to the drawings 4 indicates a support in the form of a two-part clamping-bracket attachable to a fork-prong of a bicycle or motorcycle, the right angle extension 4' of one of the bracket-sections being provided with a notch 5 for the purpose hereinafter specified. By means of a bolt 6, and a nut 7, therewith, a bow-frame 8 is put in detachable pivotal connection with the support, said frame being preferably in two sections riveted together. One branch of the frame 8 is provided with a lever-arm 9 for connection with a cord, chain or other suitable pull-device, and mounted in said frame is a pair of gong-bells 10, 10', arranged to have the rims thereof face one another. These bells are provided with inwardly extending central hollow shanks 11, 11', respectively, and the outward projections of the shanks engage eyes provided in the branches of the bow-frame aforesaid. The bell-shank 11 is shown upset against the adjacent frame-branch and a clamping-nut 12 is shown run on a screw-threaded outer extension of the bell-shank 11', but any suitable means may be employed for securing the bells in connection with their supporting frame.

The bell-shanks 11, 11', serve as bearings for a spindle 13, and a friction-wheel 14 is made fast on the outer end of the spindle to be brought into contact with a wheel of a vehicle provided with our bell attachment, a pull on the lever-arm 9 of the pivotal frame 8 serving to effect the contact aforesaid and thereby provide for rapid rotary movement of said spindle. The pull on said lever-arm is against resistance of a spring 15 connecting the bell-frame 8 and its support 4, and the spring expands to automatically return said bell-frame and parts therewith to normal position after the operation aforesaid. As a matter of detail, the spring is herein shown attached at its ends to a stop-lug 8' of the frame 8 and to the clamping-bracket 4, the notch 5 of said bracket being normally engaged by said lug, for which it constitutes a seat.

Fast on the spindle 13 between the inner ends of the bell-stems 11, 11', is a plate 16 that extends equally in opposite directions from said spindle and is provided with laterally projecting headed stems 17 in rigid connection therewith adjacent to its ends. These stems extend in opposite directions from the plate, and in sliding engagement with said stems are slotted strikers 18. A washer 19 on each plate-stem opposes the adjacent striker, and a spring 20 is arranged on said stem under compression between the head of the same and the washer.

Lugs 21 are provided inside the bells 10, 10', in the paths of the strikers 18 that move outward on their supporting stems under centrifugal force when the plate 16 is rotated with the driven spindle 13, said strikers serving to ring the bells.

As a matter of detail, the spindle 13 is slabbed on opposite sides for that portion of the length thereof that occurs between the inner ends of the bell-shanks, and the plate 16 is primarily provided with a round central opening (as shown by dotted lines in Fig. 3) to be slipped on said spindle, and by a squeezing operating said plate is made fast upon the angular portion of the aforesaid spindle to which it conforms. This is a very simple and economical way of rigidly connecting the spindle and striker-carrying plate, and an important feature of our invention. It is also to be noted that the spindle has long bearings, and hence it is not liable to become bent or broken incidental to pressure of the friction-wheel on an opposing driver.

The attachment as a whole is readily separable to provide for access to the inside of the bells in case repairs are necessary and the disposition of said bells is such that dirt or moisture entering the same finds ready egress therefrom through the intervening space shown in Fig. 1.

Wheel-actuated bells similar to the one shown and described may be readily applied, and various changes in matters of detail with respect to imparting rotary motion to their spindles may be made without departure from our invention as herein claimed.

We claim:—

1. The combination of a frame attachable to a support, a pair of gong-bells mounted in the frame to have their rims face one another and provided with inwardly extending shanks constituting bearings, a driven spindle in the bearings, and a striker-carrying plate centrally secured to the spindle between the inner ends of the bell-shanks.

2. The combination of a support, a frame in pivotal connection with the support, a pair of gong-bells mounted in the frame to have their rims face one another and provided with inwardly extending shanks constituting bearings, a driven spindle in the bearings, a wheel fast on the spindle to be brought into frictional contact with a driver by a pivotal adjustment of said frame, and a striker-carrying plate centrally secured to said spindle between the inner ends of the bell-shanks.

3. The combination of a support, a frame in spring-controlled pivotal connection with the support and provided with a lever arm, a pair of gong-bells mounted in the frame to have their rims face one another and provided with inwardly extending shanks constituting bearings, a driven spindle in the bearings, a wheel fast on the spindle to be brought into frictional contact with a driver by a pivotal adjustment of said frame, and a striker-carrying plate centrally secured to said spindle between the inner ends of the bell-shanks.

4. The combination of a frame attachable to a support, a pair of gong-bells mounted in the frame to have their rims face one another and provided with inwardly extending shanks constituting bearings, a driven spindle in the bearings having an angular portion between the inner ends of said bearings, and a striker-carrying plate in squeeze fit upon said angular portion of the spindle.

In testimony that we claim the foregoing we have hereunto set our hands at Milwaukee in the county of Milwaukee and State of Wisconsin in the presence of two witnesses.

GEORGE F. CREMER.
J. J. LANTRY.

Witnesses:
N. E. OLIPHANT,
M. E. DOWNEY.